US012606174B2

(12) United States Patent
Nishimura et al.

(10) Patent No.: US 12,606,174 B2
(45) Date of Patent: Apr. 21, 2026

(54) INFORMATION PROCESSING METHOD

(71) Applicants: TOYOTA JIDOSHA KABUSHIKI KAISHA, Toyota (JP); Nomura Research Institute, Ltd., Tokyo (JP)

(72) Inventors: Kazuya Nishimura, Anjo (JP); Naoki Uenoyama, Kasugai (JP); Keiko Nakano, Kawasaki (JP); Yohei Nakanishi, Nagoya (JP); Takahiro Matsumura, Tokyo (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 40 days.

(21) Appl. No.: 18/678,244

(22) Filed: May 30, 2024

(65) Prior Publication Data

US 2025/0010863 A1     Jan. 9, 2025

(30) Foreign Application Priority Data

Jul. 7, 2023     (JP) ................................. 2023-112125

(51) Int. Cl.
B60W 40/04          (2006.01)

(52) U.S. Cl.
CPC ......... B60W 40/04 (2013.01); B60W 2400/00 (2013.01); B60W 2420/403 (2013.01); B60W 2520/04 (2013.01); B60W 2554/20 (2020.02); B60W 2756/10 (2020.02)

(58) Field of Classification Search
CPC ....... B60W 2400/00; B60W 2420/403; B60W 2520/04; B60W 2554/20; B60W 2756/10; B60W 40/04; G06V 20/58
See application file for complete search history.

(56) References Cited

U.S. PATENT DOCUMENTS

| | | | | |
|---|---|---|---|---|
| 2016/0339959 A1* | 11/2016 | Lee | | G06V 20/588 |
| 2019/0236952 A1* | 8/2019 | Suzuki | | G08G 1/0133 |
| 2020/0079368 A1* | 3/2020 | Yamada | | G08G 1/166 |
| 2021/0016810 A1* | 1/2021 | Lin | | B61L 23/041 |
| 2021/0046950 A1* | 2/2021 | Prehofer | | H04W 4/38 |
| 2021/0291836 A1* | 9/2021 | Cho | | B60W 30/18054 |

(Continued)

FOREIGN PATENT DOCUMENTS

| | | | | | |
|---|---|---|---|---|---|
| CN | 104506794 A | * | 4/2015 | | |
| CN | 109598187 A | * | 4/2019 | ............. | G06V 20/58 |

(Continued)

*Primary Examiner* — Babar Sarwar
(74) *Attorney, Agent, or Firm* — Sughrue Mion, PLLC

(57) ABSTRACT

An information processing method is a method executed by an information processing system including: a vehicle including an imaging unit and a communication unit; and a server device. The information processing method includes: requesting, by the server device, the vehicle positioned in an information collecting area including a stop position of a train that moves on a railroad track to provide a peripheral image when the train stops between stations; and transmitting, by the communication unit of the vehicle positioned in the information collecting area, a stoppage factor image that is the peripheral image in which at least one of the train that has stopped in the stop position and the railroad track near the train appears to the server device.

5 Claims, 4 Drawing Sheets

(56) References Cited

U.S. PATENT DOCUMENTS

| 2022/0254166 A1 * | 8/2022 | Sasaki | B60W 60/0015 |
| 2022/0289189 A1 * | 9/2022 | Komuro | B60W 30/18145 |
| 2023/0133213 A1 * | 5/2023 | Kim | B60W 50/0097 |
| | | | 701/2 |
| 2023/0138981 A1 * | 5/2023 | Willoughby | B60W 30/143 |
| | | | 701/26 |
| 2024/0010190 A1 * | 1/2024 | Naes | B60W 30/18 |
| 2024/0289932 A1 * | 8/2024 | Ye | G06T 17/00 |

FOREIGN PATENT DOCUMENTS

| CN | 110281983 | A | * | 9/2019 | B61C 17/12 |
| CN | 209351405 | U | * | 9/2019 | |
| CN | 111409670 | A | * | 7/2020 | B61L 15/0054 |
| JP | H09226584 | A | * | 9/1997 | |
| JP | 2010176612 | A | * | 8/2010 | |
| JP | 2019133281 | A | * | 8/2019 | G08G 1/0133 |
| JP | 2024137377 | A | * | 10/2024 | |
| WO | WO-2013069772 | A1 | * | 5/2013 | B61L 27/16 |
| WO | WO-2014130178 | A1 | * | 8/2014 | G08G 1/161 |
| WO | WO-2015134311 | A1 | * | 9/2015 | G08G 1/096822 |
| WO | WO-2018104462 | A1 | * | 6/2018 | B61L 23/042 |

* cited by examiner

INFORMATION PROCESSING METHOD

CROSS-REFERENCE TO RELATED APPLICATION

This application claims priority to Japanese Patent Application No. 2023-112125 filed on Jul. 7, 2023, incorporated herein by reference in its entirety.

BACKGROUND

1. Technical Field

The present disclosure relates to an information processing method.

2. Description of Related Art

In railway operations, an operation situation of a train in a managed railroad section is grasped and a railroad track environment is monitored in a command center. When an event that causes a problem in the operation of the train occurs, a driver or a conductor of the train stops the train and sends a message regarding details of the event to the command center. For example, Japanese Unexamined Patent Application Publication No. 2010-176612 (JP 2010-176612 A) discloses that a message indicating that an event that causes a problem in the operation of a train has occurred is sent to a driver or a conductor of another train positioned in a managed railroad section of a command center.

SUMMARY

A driver or a conductor is required to grasp a stoppage factor of a train when the train stops between stations, for example. Meanwhile, it may be difficult for the driver or the conductor to immediately grasp the stoppage factor because the driver or the conductor is required to communicate with the command center and give guidance to passengers by a train announcement. In the technology disclosed in JP 2010-176612 A, it has not been possible to grasp the stoppage factor of the train even though it has been possible to tell the driver or the conductor of another train that an event that causes a problem in the operation of the train has occurred.

An information processing method for solving the problem described above is executed by an information processing system. The information processing system includes: a vehicle including an imaging unit that generates a peripheral image by imaging a peripheral situation, and a communication unit that communicates with the outside; and a server device installed outside of the vehicle. The peripheral image is transmitted to the server device from the communication unit of the vehicle via a communication network. The information processing method includes: requesting, by the server device, the vehicle positioned in an information collecting area including a stop position of a train that moves on a railroad track to provide the peripheral image when the train stops between stations; and transmitting, by the communication unit of the vehicle positioned in the information collecting area, a stoppage factor image that is the peripheral image in which at least one of the train that has stopped in the stop position and the railroad track near the train appears to the server device.

According to this configuration, an effect of enabling reduction of cases in which it takes time to grasp the stoppage factor of the train is exhibited.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

One embodiment of an information processing method is described below with reference to FIG. 1 to FIG. 6.
Entire Configuration of Information Processing System 1

Figure 1:
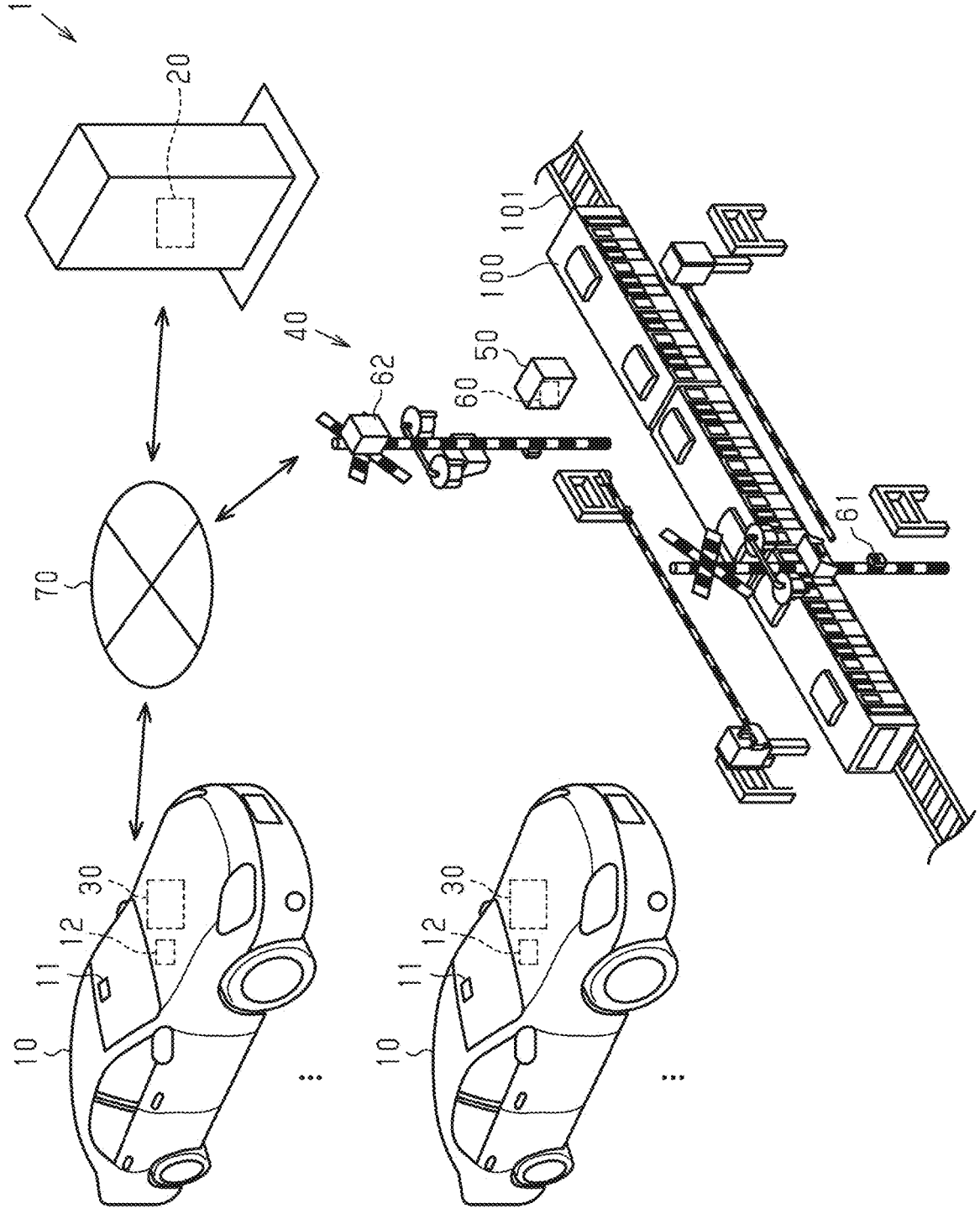
FIG. 1 is a view used in the description of an information processing system.

As shown in FIG. 1, an information processing system 1 that realizes the information processing method includes one or more vehicles 10, a server device 20, and one or more railroad crossing control devices 60, for example. The vehicle 10 includes an imaging unit 11, a positional information acquisition unit 12, and a control device 30, for example. The railroad crossing control devices 60 are respectively installed in railroad crossing equipment boxes 50 provided in the vicinity of different railroad crossings 40. The control device 30, the server device 20, and the railroad crossing control device 60 are connected to each other so as to be able to transmit and receive information to and from each other via a communication network 70. The communication network 70 includes the Internet, a wide area network (WAN), a local area network (LAN), a provider terminal, a wireless communication network, a wireless base station, and an exclusive line, for example.

The imaging unit 11 is a digital camera using a solid-state image sensor such as a charge-coupled device (CCD) and a complementary metal oxide semiconductor (CMOS), for example. One example of the imaging unit 11 is a digital camera configuring a dashboard camera. The imaging unit 11 images a peripheral situation of the vehicle 10. The imaging unit 11 can image the front side, the rear side, and the sides of the vehicle 10 depending on the installment position of the imaging unit 11 in the vehicle 10. The imaging unit 11 generates a peripheral image by imaging the peripheral situation of the vehicle 10. When the vehicle 10 travels in the vicinity of the railroad crossing 40 or a railroad track 101, a train 100 or the railroad track 101 may appear be in the peripheral image generated by the imaging unit 11.

The positional information acquisition unit 12 is a receiver of a global navigation satellite system (GNSS), for example. The positional information acquisition unit 12 specifies the position of the vehicle 10 and acquires positional information indicating the position of the vehicle 10 on the basis of a signal received from a GNSS satellite.

The control device 30 enables the server device 20 to specify the position of the vehicle 10 by transmitting the positional information to the server device 20 at every predetermined time interval. The control device 30 transmits a stoppage factor image to the server device 20 when there is a request from the server device 20. The stoppage factor image is a peripheral image in which at least either of the train 100 stopped between stations or the railroad track 101 near the train 100 appears out of the peripheral images. In other words, the stoppage factor image is an image having a high possibility of having the stoppage factor of the train 100 appear in the image.

The server device 20 is a device that aggregates information used in operation management of the train 100 that travels a managed railroad section, for example. The server device 20 is provided in a command center, for example. A dispatcher of the command center refers to the information aggregated in the server device 20 and performs the operation management of the train 100 that travels in the managed railroad section.

The railroad crossing control device 60 controls the railroad crossing 40 to be controlled. Specifically, the railroad crossing control device 60 causes a warning device of the railroad crossing 40 to ring, lowers a barrier rod, and causes a warning light to flash when an electronic train detector of the railroad crossing 40 detects that the train 100 is approaching. The railroad crossing control device 60 stops the warning device of the railroad crossing 40, rises the barrier rod, and stops the flashing of the warning light when the electronic train detector of the railroad crossing 40 detects the passing of the train 100.

An emergency stop button 61 and an obstruction detecting device 62 are connected to the railroad crossing control device 60. The emergency stop button 61 is operated by a passerby passing through the railroad crossing 40 or a driver of the vehicle 10 passing through the railroad crossing 40. When the emergency stop button 61 is operated, the railroad crossing control device 60 causes an obstruction warning indicator provided in front of the railroad crossing 40 to flash, and transmits a stop signal to the train 100 in the vicinity of the railroad crossing 40. The obstruction detecting device 62 detects an obstacle in the railroad crossing 40. The obstruction detecting device 62 detects an obstruction by detecting systems such as an optical sensor system, a loop coil system, and a three-dimensional laser radar system, for example. When an obstacle is detected by the obstruction detecting device 62, the railroad crossing control device 60 causes the obstruction warning indicator to flash and transmits a stop signal. When the obstruction warning indicator is flashing or the stop signal is received from the railroad crossing control device 60, a driver of the train 100 approaching the railroad crossing 40 stops the train 100 in front of the railroad crossing 40.

Configuration of Control Device 30

Figure 2:
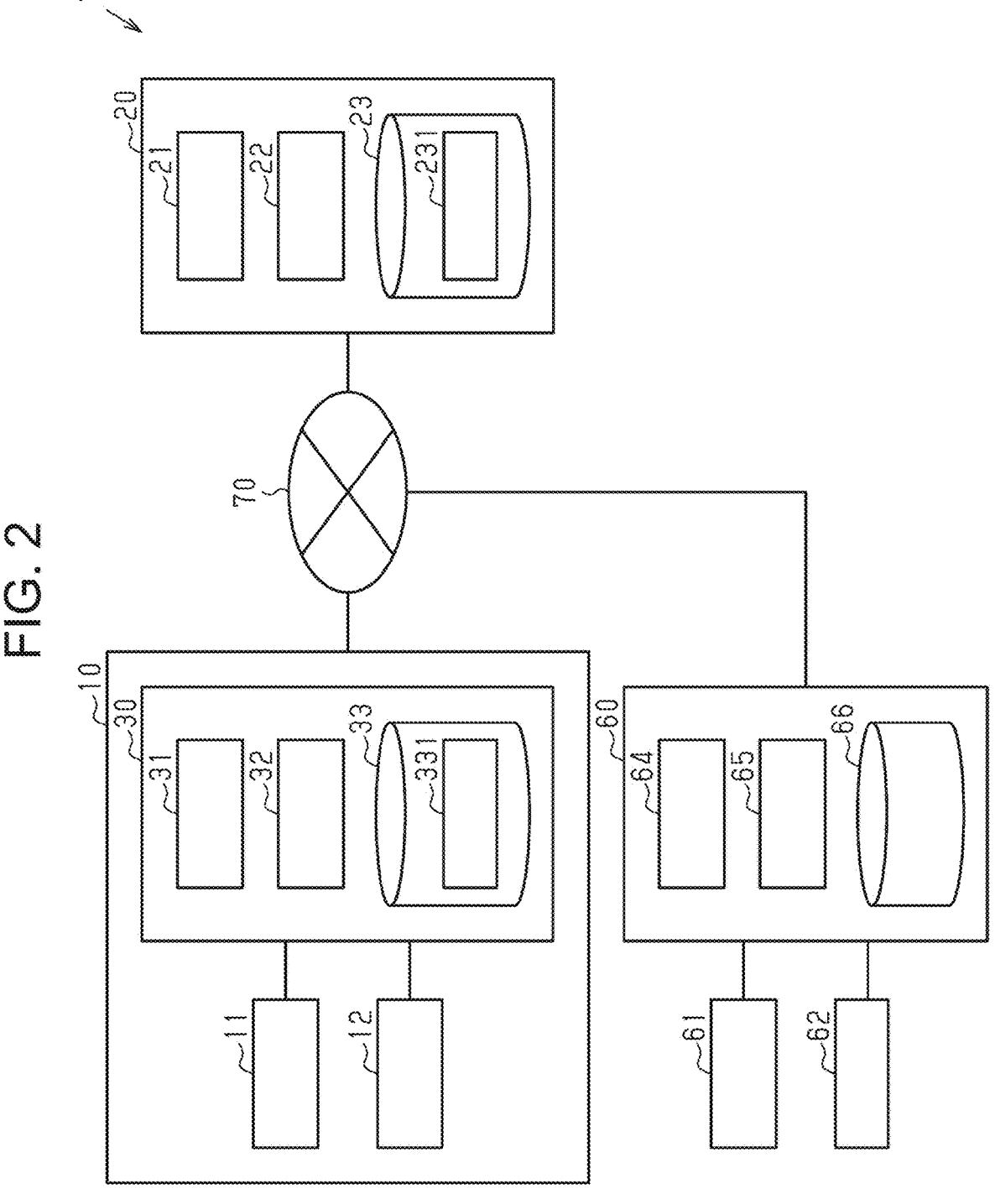
FIG. 2 is a diagram showing one example of a configuration of a server device, a control device, and a railroad crossing control device.

As shown in FIG. 2, the control device 30 includes a processing circuit 31, a communication unit 32, and a storage unit 33, for example. The processing circuit 31 is configured by a hardware processor such as a central processing unit (CPU), for example. The processing circuit 31 can execute various processing as a result of the hardware processor executing a program. The program may be stored in the storage unit 33 in advance. The storage unit 33 is realized by a non-transitory storage medium such as a hard disk drive (HDD) or a flash memory, for example. The communication unit 32 includes a communication circuit or a communication module, for example, and transmits and receives various data to and from the server device 20 and other equipment on the basis of the control of the processing circuit 31.

The storage unit 33 stores therein a learned model 331, for example. The learned model 331 is obtained by performing machine learning that determines whether the peripheral image generated by the imaging unit 11 is a stoppage factor image. Specifically, the learned model 331 is obtained by performing machine learning that determines whether at least one of (A1) and (A2) appears in the peripheral image generated by the imaging unit 11.

(A1) The train 100 stopped between stations (A2) The railroad track 101 near the train 100 stopped between stations One example of the learned model 331 is a neural network. When the peripheral image is input to the learned model 331 as an input variable, the learned model 331 outputs an output variable indicating the probability of the peripheral image being the stoppage factor image. For example, the learned model 331 outputs a greater value as an output variable as the probability of the train 100 and the railroad track 101 appearing in the peripheral image becomes higher.

When the communication unit 32 receives a command for providing the stoppage factor image to the server device 20, the processing circuit 31 determines whether the peripheral image generated by the imaging unit 11 at the time point of receival is a stoppage factor image. When the communication unit 32 receives a command for providing the stoppage factor image to the server device 20, the processing circuit 31 determines whether the peripheral image generated by the imaging unit 11 at a time point that is a predetermined amount of time earlier than the time point of receival is a stoppage factor image. The processing circuit 31 reads out a peripheral image generated by the imaging unit 11 at a time point that is a predetermined amount of time earlier out of the peripheral images stored in the storage unit of the dashboard camera, for example, and uses the peripheral image in processing of determining a stoppage factor image. The predetermined amount of time is an amount of time that is about several seconds to several minutes, for example.

The processing circuit 31 inputs a peripheral image generated by the imaging unit 11 at the time point of receival to the learned model 331, and determines that the peripheral image is a stoppage factor image when an output variable that is output is equal to or more than a threshold value. The processing circuit 31 inputs a peripheral image generated by the imaging unit 11 at a time point that is a predetermined amount of time earlier than the time point of receival to the learned model 331, and determines that the peripheral image is a stoppage factor image when an output variable that is output is equal to or more than a threshold value. Meanwhile, when the output variable is less than the threshold value, the processing circuit 31 determines that the peripheral image input to the learned model 331 is not a stoppage factor image.

The processing circuit 31 causes the communication unit 32 to transmit the stoppage factor image determined to be a stoppage factor image to the server device 20.

Configuration of Railroad Crossing Control Device 60

As shown in FIG. 2, the railroad crossing control device 60 includes a processing circuit 64, a communication unit 65, and a storage unit 66, for example. The processing circuit 64 is configured by a hardware processor such as a CPU, for example. The processing circuit 64 can execute various processing as a result of the hardware processor executing a program. The program may be stored in the storage unit 66 in advance. The storage unit 66 is realized by a non-transitory storage medium such as an HDD and a flash memory, for example. The communication unit 65 includes a communication circuit or a communication module, for example, and transmits and receives various data to and from the server device 20 and other equipment on the basis of the control of the processing circuit 64.

The processing circuit 64 determines whether the emergency stop button 61 connected to the railroad crossing control device 60 is pressed down. When at least one of two conditions (E1) and (E2) indicated below is established, the processing circuit 64 performs control according to the obstruction warning indicator and the transmission of the stop signal, and transmits information indicating that the emergency stop button 61 is pressed down to the server device 20.

(E1) When the emergency stop button 61 is pressed down.

(E2) When the obstruction detecting device 62 determines that an obstacle is detected in the railroad crossing 40.

Configuration of Server Device 20

As shown in FIG. 2, the server device 20 includes a processing circuit 21, a communication unit 22, and a storage unit 23, for example. The processing circuit 21 is configured by a hardware processor such as a CPU, for example. The processing circuit 21 can execute various processing as a result of the hardware processor executing a program. The program may be stored in the storage unit 23 in advance. The storage unit 23 is realized by a non-transitory storage medium such as an HDD and a flash memory, for example. The communication unit 22 includes a communication circuit or a communication module, for example, and transmits and receives various data to and from the control device 30, the railroad crossing control device 60, and other equipment on the basis of the control of the processing circuit 21.

The storage unit 23 stores therein a learned model 231, for example. The learned model 231 is obtained by performing machine learning that presumes a stoppage factor of the train 100 on the basis of the stoppage factor image received from the control device 30 by the communication unit 22. One example of the learned model 231 is a neural network. When the stoppage factor image is input to the learned model 231 as an input variable, the learned model 231 outputs a plurality of output variables indicating the probability of each stoppage factor defined in advance. In this case, the processing circuit 21 of the server device 20 presumes the stoppage factor of which output variable is the highest to be the stoppage factor of the train 100.

Here, the stoppage factor when the emergency stop button 61 is pressed down or the train 100 stops in front of the railroad crossing 40 or in the railroad crossing 40 is determined to some extent. Specifically, as the stoppage factor of the train 100, six events (B1) to (B6) below are indicated as one example. The six events (B1) to (B6) are one example and limitation is not made thereto.

(B1) There is an object such as a stone in the direction of travel of the train 100.

(B2) There is a vehicle 10 in the direction of travel of the train 100.

(B3) There is a passerby in the direction of travel of the train 100.

(B4) The train 100 is derailed from the railroad track 101.

(B5) The train 100 has come into contact with a vehicle 10.

(B6) The train 100 has come into contact with a passerby.

The learned model 231 is obtained by performing machine learning so as to be able to presume which of the six events (B1) to (B6) above is the stoppage factor of the train 100 appearing in the stoppage factor image by performing learning by stoppage factor images obtained when the events (B1) to (B6) occur.

The processing circuit 21 determines whether the train 100 is stopped between stations on the basis of an on-track detection result of the train 100 specified by an operation management function of the server device 20. When the processing circuit 21 determines that the train 100 is stopped between stations, the processing circuit 21 sets an information collecting area including a stop position of the train 100. In this case, the information collecting area is an area from the stop position of the train 100 to a position spaced apart from the stop position by a predetermined distance. As described above, the processing circuit 21 receives positional information indicating the position of the vehicle 10 from the control device 30 by the communication unit 22 at every predetermined time interval. The processing circuit 21 specifies the vehicle 10 positioned in the set information collecting area on the basis of the received positional information. The processing circuit 21 transmits a command for transmitting the stoppage factor image to the server device 20 to the specified vehicle 10 by the communication unit 22. As described above, when the control device 30 receives the command for providing the stoppage factor image to the server device 20, the control device 30 transmits the stoppage factor image to the server device 20.

The processing circuit 21 determines whether two conditions (C1) or (C2) below are satisfied.

(C1) Information indicating that the emergency stop button 61 is pressed down is received from the railroad crossing control device 60.

(C2) Information indicating that an obstacle is detected by the obstruction detecting device 62 is received from the railroad crossing control device 60.

When the processing circuit 21 determines that at least one of the conditions (C1) and (C2) is satisfied, the processing circuit 21 sets an information collecting area including the position of the railroad crossing 40 corresponding to the railroad crossing control device 60 that has transmitted the information. In this case, the information collecting area is an area from the position of the railroad crossing 40 to a position spaced apart from the position by a predetermined distance. The processing circuit 21 specifies the vehicle 10 positioned in the set information collecting area on the basis of the positional information received from the vehicle 10. The processing circuit 21 transmits, to the specified vehicle 10 by the communication unit 22, a command for providing the stoppage factor image to the server device 20.

The processing circuit 21 determines whether a first image is included in the stoppage factor image received from the control device 30 as a result of the processing described above. The first image is a stoppage factor image that satisfies at least one of three conditions (D1) to (D3) below.

(D1) The stop position of the train 100 appears.

(D2) The railroad track 101 near the stop position of the train 100 appears.

(D3) The railroad track 101 between a station in the direction of travel of the train 100 and the stop position appears.

The expression of "near the stop position" is a range of several tens of centimeters to several meters from the stop position of the train 100, for example. Therefore, the stoppage factor image that satisfies the condition (D2) is an image in which both of the train 100 and the railroad track 101 appear and the size of the train 100 shown in the stoppage factor image is equal to or more than a predetermined size, for example.

The processing circuit 21 determines whether each stoppage factor image received from the control device 30 is the first image or is a second image that is a stoppage factor image other than the first image by specifying the object of shooting that appears in the stoppage factor image by general image analysis. The processing circuit 21 presumes the stoppage factor of the train 100 on the basis of only the first image besides the second image out of the received stoppage factor images when at least the first image has been able to be received from the control device 30. The second image is described later.

Next, the processing circuit 21 applies higher priorities to the first images in which the stoppage factor of the train 100 appears in an easier-to-see manner. Hereinafter, the processing circuit 21 applies a higher priority as the first image becomes a higher-angle image. The processing circuit 21 specifies whether the first image is a high-angle image, a horizontal image, or a low-angle image and applies a priority by general image analysis, for example. The processing circuit 21 excludes first images of which priority is less than a predetermined threshold value from the specified first images and presumes the stoppage factor of the train 100 on the basis of first images of which priority is equal to or more than the predetermined threshold value.

The processing circuit 21 presumes the stoppage factor of the train 100 on the basis of an output variable of the learned model 231 when the first image to which the priority equal to or more than the predetermined threshold value is input to the learned model 231. As described above, the processing circuit 21 presumes the stoppage factor of which output variable is the highest to be the stoppage factor of the train 100.

Series of Processing Executed in Server Device 20: Request for Providing Stoppage Factor Image With reference to FIGS. 3 and 4, processing according to a request for a stoppage factor image executed in the server device 20 is described. The processing circuit 21 executes processing of receiving positional information indicating the position of the vehicle 10 from the control device 30 by the communication unit 22 at every predetermined time interval besides the processing shown in FIGS. 3 and 4.

Figure 3:
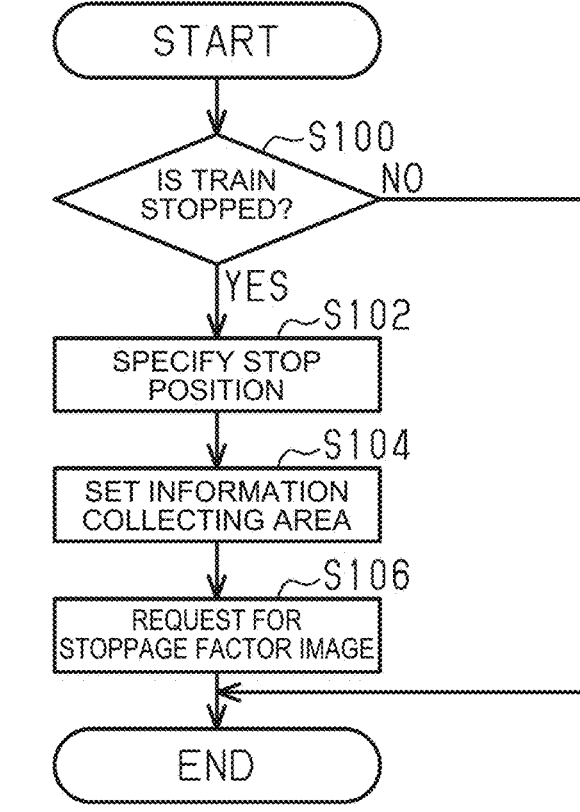
FIG. 3 is a flowchart showing one example of processing executed in the server device.

As shown in FIG. 3, first, the processing circuit 21 determines whether the train 100 is stopped between stations on the basis of an on-track detection result of the train 100 specified by an operation management function of the server device 20 (Step S100). When the processing circuit 21 determines that the train 100 is not stopped between stations (Step S100; NO), the processing circuit 21 has no need to request the control device 30 for a stoppage factor image and hence ends the series of processing. When the processing circuit 21 determines that the train 100 is stopped between stations (Step S100; YES), the processing circuit 21 specifies the stop position of the train 100 on the basis of the on-track detection result of the train 100 (Step S102). Next, the processing circuit 21 sets an information collecting area on the basis of the stop position of the train 100 specified in Step S102 (Step S104). The information collecting area is an area from the stop position of the train 100 to a position spaced apart from the stop position by a predetermined distance. Next, the processing circuit 21 requests the vehicle 10 positioned in the information collecting area to provide a stoppage factor image on the basis of the positional information received from the control device 30 (Step S106). Then, the processing circuit 21 ends the series of processing.

Figure 4:
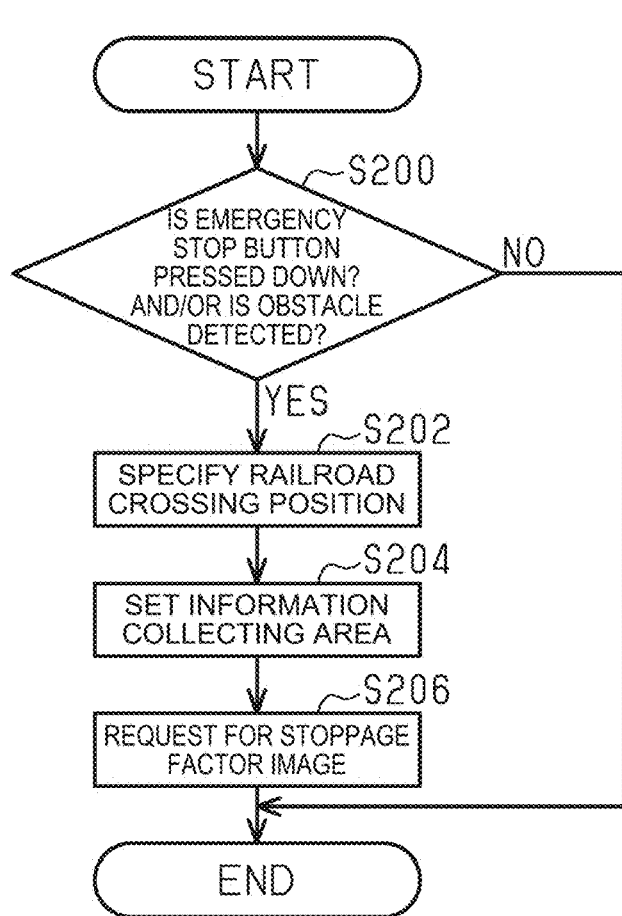
FIG. 4 is a flowchart showing one example of processing executed in the server device.

As shown in FIG. 4, first, the processing circuit 21 determines whether at least one of the two conditions (C1) and (C2) is satisfied (Step S200). When the processing circuit 21 determines that neither of the conditions (C1) nor (C2) is satisfied (Step S200; NO), the processing circuit 21 has no need to request the control device 30 for a stoppage factor image and hence ends the series of processing. When the processing circuit 21 determines that at least one of the conditions (C1) and (C2) is satisfied (Step S200; YES), the processing circuit 21 specifies the position of the railroad crossing 40 corresponding to the railroad crossing control device 60 that has transmitted the information according to Step S200 (Step S202). Next, the processing circuit 21 sets an information collecting area on the basis of the position of the railroad crossing 40 specified in Step S202 (Step S204). The information collecting area is an area from the corresponding railroad crossing 40 to a position spaced apart from the railroad crossing 40 by a predetermined distance. Next, the processing circuit 21 requests the vehicle 10 positioned in the information collecting area to provide a stoppage factor image on the basis of the positional information received from the control device 30 (Step S206). Then, the processing circuit 21 ends the series of processing.

Series of Processing Executed in Control Device 30: Provision of Stoppage Factor Image With reference to FIG. 5, processing according to the provision of the stoppage factor image executed in the control device 30 is described. The processing circuit 31 executes processing of transmitting, by the communication unit 32, the positional information indicating the position of the vehicle 10 acquired by the positional information acquisition unit 12 at every predetermined time interval besides the processing shown in FIG. 5.

Figures 5, 6:
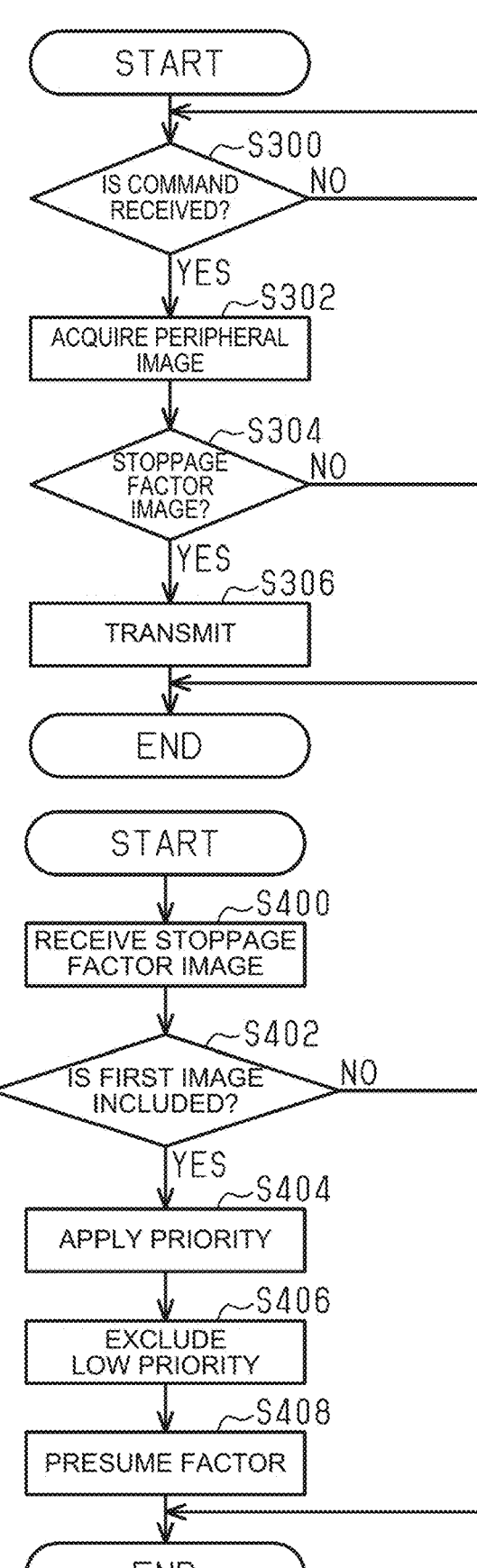
FIG. 5 is a flowchart showing one example of processing executed in the control device.
FIG. 6 is a flowchart showing one example of processing executed in the server device.

As shown in FIG. 5, the processing circuit 31 determines whether a command for providing the stoppage factor image to the server device 20 is received from the server device 20 (Step S300). The processing circuit 31 repeats determining processing of Step S300 and waits until the command is received (Step S300; NO). When the processing circuit 31 determines that the command for providing the stoppage factor image to the server device 20 has been received (Step S300; YES), the processing circuit 31 acquires a peripheral image generated by the imaging unit 11 (Step S302). The peripheral image acquired in Step S302 is a peripheral image imaged and generated by the imaging unit 11 at a time point at which the processing circuit 31 receives the command in Step S300. The peripheral image acquired in Step S302 is a peripheral image imaged and generated by the imaging unit 11 a predetermined amount of time earlier than the time point at which the processing circuit 31 receives the command in Step S300 and has been stored in the dashboard camera.

The processing circuit 31 determines whether the peripheral image acquired in Step S302 is a stoppage factor image (Step S304). When the processing circuit 31 determines that the peripheral image acquired in Step S302 is not a stoppage factor image, the processing circuit 31 considers that there are no stoppage factor images that can be provided to the server device 20 and ends the series of processing. When the processing circuit 31 determines that the peripheral image acquired in Step S302 is a stoppage factor image, the processing circuit 31 transmits the stoppage factor image to the server device 20 by the communication unit 32 (Step S306). Then, the processing circuit 31 ends the series of processing.

Series of Processing Executed in Server Device 20: Presumption of Stoppage Factor With reference to FIG. 6, processing according to presumption of a stoppage factor executed in the server device 20 is described. As shown in FIG. 6, the processing circuit 21 receives the stoppage factor image from the control device 30 by the communication unit 22 (Step S400). The processing circuit 21 determines whether a first image is included in the stoppage factor image received from the control device 30 (Step S402). When a first image is not included in the stoppage factor image received from the control device 30, the processing circuit 21 ends the series of processing because the presumption of the stoppage factor of the train 100 is difficult.

When the processing circuit 21 determines that a first image is included in the stoppage factor image (Step S402; YES), the processing circuit 21 applies a higher priority to a higher-angle image for images determined to be a first image in Step S402 (Step S404). Next, the processing circuit 21 excludes a first image of which priority is a priority less than a predetermined threshold value out of the first images to which priorities are applied in Step S402 (Step S406). Next, the processing circuit 21 presumes the stoppage factor of the train 100 on the basis of the first images that are not excluded in Step S406 (Step S408). Then, the processing circuit 21 ends the series of processing.

Operations and Effects of Embodiment

According to the embodiment described above, operations and effects as follows can be obtained.

(1) The imaging unit 11 generates a peripheral image by imaging the periphery of the vehicle 10. The positional information acquisition unit 12 acquires the positional information of the vehicle 10 and transmits the acquired positional information to the server device 20.

The server device 20 requests the vehicle 10 positioned in the information collecting area including the stop position of the train 100 that travels on the railroad track 101 to provide a peripheral image when the train 100 has stopped between stations.

In the vehicle 10 requested to provide a peripheral image, the processing circuit 31 specifies a stoppage factor image from a peripheral image generated by the imaging unit 11. The processing circuit 31 provides the peripheral image to the server device 20 by transmitting the specified stoppage factor image to the server device 20.

When the train 100 stops between stations, the driver or a conductor of the train 100 is required to grasp the stoppage factor by getting off the train 100 and checking the periphery of the train 100. In order for the dispatcher in the command center to grasp or presume the stoppage factor of the train 100, it is preferred that there be a peripheral image obtained by imaging the train 100 and the periphery of the train 100 in addition to a call with the driver or the conductor of the train 100. In other words, there is a fear that it takes time until the stoppage factor of the train 100 can be grasped.

According to this configuration, the server device 20 collects the stoppage factor image as the peripheral image imaged by the imaging unit 11 of the vehicle 10 positioned in the information collecting area including the stop position of the train 100. As a result, in the information processing method, the dispatcher in the command center refers to the stoppage factor image collected in the server device 20, and hence it becomes possible to reduce cases in which it takes time to grasp the stoppage factor of the train 100.

(2) The processing circuit 21 presumes the stoppage factor of the stoppage of the train 100 on the basis of the stoppage factor image. Specifically, the processing circuit 21 presumes the stoppage factor of the train 100 on the basis of the output variable of the learned model 231 when the stoppage factor image is input to the learned model 231. In other words, in the information processing method, the stoppage factor of the train 100 can be presumed on the basis of a stoppage factor image including more objective information as compared to a call with the driver or the conductor of the train 100. In the information processing method, the stoppage factor of the train 100 can be easily presumed by using the learned model 231.

(3) The processing circuit 21 sets the information collecting area such that the position of the railroad crossing 40 is included when the emergency stop button 61 provided in the railroad crossing 40 is pressed down. The processing circuit 21 sets the information collecting area such that the position of the railroad crossing 40 is included when an obstacle is detected in the railroad crossing 40 by the obstruction detecting device 62 provided in the railroad crossing 40. Therefore, in the information processing method, the stoppage factor image can be collected in the server device 20 by a trigger of the emergency stop button 61 being pressed down or an obstacle being detected by the obstruction detecting device 62.

(4) The processing circuit 21 determines whether the first image is included in the stoppage factor image received from the control device 30. When the processing circuit 21 determines that the first image is included in the stoppage factor image, the processing circuit 21 considers that at least the first image has been able to be received and presumes the stoppage factor of the train 100 on the basis of the first image.

When the stoppage factor image is the first image that satisfies the condition (D1), the situation of the stop position of the train 100 and the state of the train 100 can be checked by referring to the first image. When the stoppage factor image is the first image that satisfies the condition (D2), the states of the train 100 and the railroad track 101 such as whether there is an obstacle on the railroad track 101 near the stop position of the train 100, whether there is an object that has come into contact with the train 100, and whether there is a damage on the railroad track 101 by referring to the first image can be checked. When the stoppage factor image is the first image that is satisfies the condition (D3), whether there are no problems in the operation of the train 100 can be checked when the train 100 moves to the station in the direction of travel by referring to the first image. Therefore, it is preferred that the first image that is the stoppage factor image that satisfies at least one of the conditions (D1) to (D3) be used to presume the stoppage factor of the train 100.

Meanwhile, the stoppage factor images include the second image in which at least one of (A1) and (A2) appears but which does not satisfy the conditions (D1) to (D3). In other words, the second image is an image in which the train 100 stopped between stations and the railroad track 101 near the train 100 appear but the train 100 and the railroad track 101 do not appear to the degree where sufficient information can be obtained due to the angle of view and the distance to the train 100. The presumption accuracy may decrease when the stoppage factor of the train 100 is presumed with use of the second image as above. In the information processing method, the stoppage factor of the train 100 is presumed by referring to only the first images other than the second images out of the collected stoppage factor images. Therefore, in the information processing method, the stoppage factor of the train 100 can be presumed at a high accuracy.

(5) When there is a request for providing a peripheral image, the processing circuit 31 transmits a stoppage factor image generated by the imaging unit 11 a predetermined amount of time earlier than a time point at which the train 100 has stopped to the server device 20. For example, when the vehicle 10 is stopped in the vicinity of the railroad crossing 40 or the railroad track 101, the imaging unit 11 may be currently generating a peripheral image by imaging the railroad crossing 40 or the railroad track 101 near the stop position of the train 100 before the train 100 stops between stations. In this case, something that may become the stoppage factor of the train 100 may be appearing in the peripheral image. Therefore, it is preferred that the processing circuit 31 use a stoppage factor image that is a peripheral image generated by the imaging unit 11 at a time point that is a predetermined amount of time earlier than the time point of receiving the command in the presumption of the stoppage factor of the train 100. Therefore, in the information processing method, the stoppage factor of the train 100 can be presumed at a higher accuracy.

(6) The processing circuit 21 applies a higher priority to the first image in which the stoppage factor of the train 100 appears in an easier-to-see manner. Specifically, the processing circuit 21 applies a higher priority as the first image becomes a higher-angle image. Here, regarding the stoppage factor image, a peripheral image generated by the imaging unit 11 included in the vehicle 10 having a high vehicle height such as a truck or a bus may have a more information amount relating to the periphery of the vehicle 10 as compared to a peripheral image generated by the imaging unit 11 included in the vehicle 10 having a low vehicle height such as a sports car. In the information processing method, the stoppage factor of the train 100 can be presumed with use of a stoppage factor image having a larger information amount.

Modified Examples

The embodiment may be changed as follows. The embodiment and each of other examples below may be combined with each other without being technically inconsistent.

The processing circuit 21 does not necessarily need to execute the processing shown in FIG. 4 out of the processing shown in FIG. 3 and the processing shown in FIG. 4. The processing circuit 21 does not necessarily need to execute the processing shown in FIG. 3 out of the processing shown in FIG. 3 and the processing shown in FIG. 4.

It is possible for the processing circuit 31 to only acquire a peripheral image imaged and generated by the imaging unit 11 at the time point at which the processing circuit 31 receives a command in Step S300 in the processing of Step S302.

The processing circuit 31 may acquire a peripheral image imaged and generated by the imaging unit 11 in a predetermined period of time including the time point at which a command is received in the processing of Step S302. The processing circuit 31 may acquire a peripheral image imaged and generated by the imaging unit 11 in a predetermined period of time including a time point that is a predetermined amount of time earlier than the time point at which a command is received in Step S302.

The processing circuit 31 may not acquire a peripheral image that is a predetermined amount of time earlier than the time point at which a command is received when the vehicle 10 moves until the time point that is a predetermined amount of time earlier than the time point at which a command is received. The processing circuit 31 determines whether the vehicle 10 has moved on the basis of a detection result of a speed detection unit of the vehicle 10, an OFF state of an ignition switch, a gear selector being in a parking range, and the like. Here, when the vehicle 10 has moved, there may be cases in which the vehicle 10 is not be positioned in the information collecting area at the time point that is a predetermined amount of time earlier than the time point at which a command is received. Therefore, when the vehicle 10 has moved, there is a high possibility that the peripheral image imaged and generated by the imaging unit 11 of the vehicle 10 at the time point that is a predetermined amount of time earlier than the time point at which a command is received may not be the stoppage factor image. According to this configuration, when the vehicle 10 has moved, the processing circuit 31 can omit the processing of determining whether the peripheral image imaged and generated by the imaging unit 11 at the time point that is a predetermined amount of time earlier than the time point at which a command is received is a stoppage factor image.

It is possible for the processing circuit 21 to only execute Step S400 out of the processing shown in FIG. 6. In this case, the information processing method can cause the dispatcher in the command center to grasp the stoppage factor of the train 100 by referring to the stoppage factor image collected from the vehicle 10 by the server device 20.

The processing circuit 21 does not necessarily need to execute the processing of Step S402 out of the processing shown in FIG. 6. In this case, the processing circuit 21 causes the processing to proceed to Step S404 after executing Step S400. Here, when the number of the vehicles 10 positioned in the information collecting area is small, for example, there may be cases in which the server device 20 can receive the second image but cannot receive the first image as the stoppage factor images. Meanwhile, when the first image cannot be received, it is preferred that the stoppage factor of the train 100 be presumed with use of the second image. According to this configuration, the information processing method can presume the stoppage factor of the train 100 on the basis of the stoppage factor image collected from the vehicle 10 by the server device 20. When the stoppage factor is presumed with use of the second images, the processing circuit 21 may also apply priorities to the second images.

The processing circuit 21 does not necessarily need to execute the processing of Step S404 and Step S406 out of the processing shown in FIG. 6. In this case, the processing circuit 21 causes the processing to proceed to Step S408 when the processing circuit 21 determines that the first image is included in the stoppage factor images (Step S402; YES). Here, when the number of the vehicles 10 positioned in the information collecting area is small, for example, there may be cases in which the server device 20 cannot sufficiently receive the first images. Meanwhile, when the first images cannot be sufficiently received, it is preferred that the stoppage factor image of the train 100 be presumed with use of the first image of which priority is low. According to this configuration, the information processing method can presume the stoppage factor of the train 100 with use of all of the first images collected from the vehicle 10 by the server device 20.

The processing circuit 21 may apply a higher priority as the first image becomes an image having more appropriate conditions instead of or in addition to a configuration of applying a higher priority as the first image becomes a higher-angle image. The image having appropriate conditions means that imaging by an appropriate exposure is performed and blown out highlights and blocked up shadows are not generated, a blurred image is not generated as a result of an appropriate focus, and imaging by an appropriate white balance is performed and a color temperature that matches with an actual object is applied, for example. The processing circuit 21 may use a learned model that can determine the above instead of general image analysis when determining whether an image is a high-angle image or an image having appropriate conditions when the priority is applied.

The processing circuit 21 may perform processing of applying a low priority to a first image in which the stoppage factor of the train 100 does not appear in an easy-to-see manner instead of the processing of applying a high priority to a first image in which the stoppage factor of the train 100 appears in an easy-to-see manner.

The processing circuit 31 may transmit the stoppage factor image to the server device 20 when the processing circuit 31 detects that there is a stoppage factor in the railroad crossing 40 and the railroad track 101. In this case, the processing circuit 31 specifies the object of shooting that appears in the stoppage factor image by general image analysis. When the processing circuit 31 determines that there is an obstacle on the railroad track 101, the processing circuit 31 transmits the stoppage factor image to the server device 20 on the basis of the specified result. According to this configuration, the information processing method can collect the stoppage factor image in the server device 20 before events in which the train 100 stops, the emergency stop button 61 is pressed down, or an obstacle is detected by the obstruction detecting device 62 occur. Therefore, the information processing method can cause the dispatcher in the command center to grasp events that may become a stoppage factor of the train 100 before those events occur.

The processing circuit 31 may transmit a first image to the server device 20 only when the stoppage factor image is the first image. In this case, the processing circuit 31 performs processing of determining whether the stoppage factor image is the first image or the second image by specifying an object of shooting that appears in the stoppage factor image by general image analysis.

The processing circuit 21 may use a learned model obtained by performing machine learning that determines whether the stoppage factor image is a first image. The learned model outputs an output variable indicating the probability of being the first image when the stoppage factor image is input, for example. When the processing circuit 31 inputs a stoppage factor image into the learned model and the output variable that is output is equal to or more than a threshold value, the processing circuit 31 determines that the stoppage factor image is a first image. Meanwhile, when the output variable is less than the threshold value, the processing circuit 31 determines that the stoppage factor image input to the learned model is a second image.

The positional information acquired by the positional information acquisition unit 12 may be specified or supplemented by an inertial navigation system (INS) using outputs of various sensors included in the vehicle 10.

Some or all of components of the processing circuit 21 and the processing circuit 31 may be realized by hardware such as a large scale integration (LSI), an application specific integrated circuit (ASIC), a field-programmable gate array (FPGA), and a graphics processing unit (GPU) (including a circuit unit; circuitry) or may be realized by a collaboration of software and hardware.

What is claimed is:

1. An information processing system comprising:
one or more vehicles including
    one or more sensors that generates peripheral images by imaging a peripheral situation, and
    a controller that communicates externally; and
a server device installed outside of the one or more vehicles, each peripheral image being transmitted to the server device from the controller of each vehicle via a communication network,
wherein:
    the server device is configured to:
        determine, based on signals received from a global navigation satellite system (GNSS) satellite, positional information indicating a position of each of the one or more vehicle, and
        request, among the one or more vehicles, at least one vehicle positioned, based on the positional information, in an information collecting area including a stop position of a train that moves on a railroad track to provide the peripheral image when the train stops between stations; and
    the controller of the vehicle positioned in the information collecting area is configured to transmit, based on the request from the server device, a stoppage factor image, that is the peripheral image capturing at least one of the train that has stopped in the stop position or the railroad track near the train, to the server device.

2. The information processing system according to claim 1, wherein a processing circuit of the server device is configured to presume a stoppage factor of the stoppage of the train based on the stoppage factor image received by the server device.

3. The information processing system according to claim 1, wherein the server device is configured to set the information collecting area such that a position of a railroad crossing is included when the train stops between stations as a result of an emergency stop button provided in the railroad crossing being pressed down.

4. The information processing system according to claim 1, wherein a processing circuit of the server device is configured to presume, a factor of the stoppage of the train based on a first image out of the first image and a second image, when at least the first image is received by the server device, the first image being the stoppage factor image in which at least one of the stop position of the train, the railroad track near the stop position, or the railroad track between the stop position of the train and a station in a direction of travel of the train is captured, the second image being the stoppage factor image other than the first image.

5. The information processing system according to claim 1, wherein the controller of the vehicle positioned in the information collecting area, is configured to transmit the stoppage factor image that is the peripheral image generated by the one or more sensors a predetermined amount of time earlier than a time point at which the train stops to the server device.

* * * * *